United States Patent [19]

Funada et al.

[11] 4,231,640
[45] Nov. 4, 1980

[54] MATRIX TYPE LIQUID CRYSTAL DISPLAY PANEL

[75] Inventors: Fumiaki Funada, Yamatokoriyama; Keisaku Nonomura, Nara; Hisashi Uede, Yamatokoriyama; Tomio Wada, Ikoma, all of

[73] Assignee: Sharp Kabushiki Kaisha, Osaka, Japan

[21] Appl. No.: 921,062

[22] Filed: Jun. 30, 1978

[30] Foreign Application Priority Data

Jul. 7, 1977 [JP] Japan .................................. 52/81794
Apr. 12, 1978 [JP] Japan .................................. 53/43430

[51] Int. Cl.² .............................................. G02F 1/13
[52] U.S. Cl. .................................... 350/336; 350/335; 340/716; 340/784
[58] Field of Search ................. 340/784, 716; 350/335, 350/336

[56] References Cited

U.S. PATENT DOCUMENTS

| | | | |
|---|---|---|---|
| 3,588,225 | 6/1971 | Nicastro | 350/335 |
| 3,936,816 | 2/1976 | Marata | 350/336 X |
| 3,938,134 | 2/1976 | Hackstein et al. | 340/784 |
| 3,981,559 | 9/1976 | Channin | 350/336 |
| 3,989,355 | 11/1976 | Wilmer | 340/784 X |

Primary Examiner—David L. Trafton
Attorney, Agent, or Firm—Birch, Stewart, Kolasch & Birch

[57] ABSTRACT

An XY matrix type liquid crystal display panel having a plurality of X electrodes aligned at a given interval in one direction, a plurality of Y electrodes alinged at a given interval in a direction normal to the one direction and a layer of liquid crystal composition disposed between the X and Y electrodes. While an electrode layer forming the Y electrodes is shaped connect divided picture element electrodes, the counterpart forming the X electrodes is arranged to confront with two or more picture element electrodes along the Y axis. Further, each of the Y electrodes is divided into two along the Y axis. A contact area of each of the divided by two Y electrodes extends toward two opposing ends of a support where the Y electrodes are disposed. In a preferred form, the matrix type liquid crystal panel comprises two or more layers of liquid crystal composition and the X and Y electrodes are so arranged that electric field-responsive operating regions of the respective liquid crystal composition layers never are overlapped with one another.

5 Claims, 15 Drawing Figures

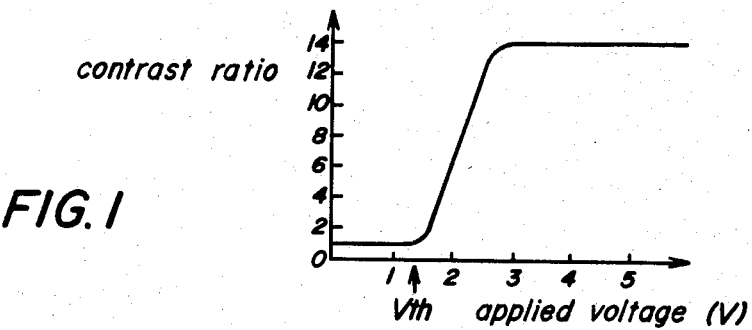
FIG. 1
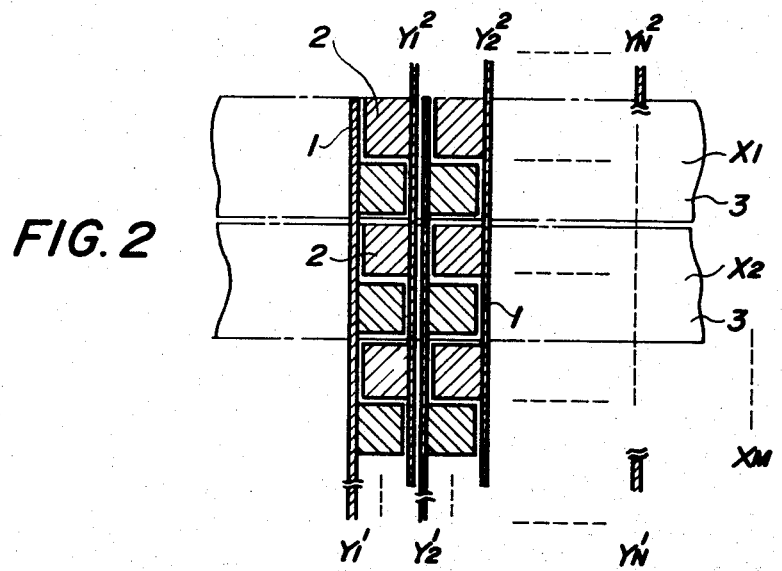
FIG. 2
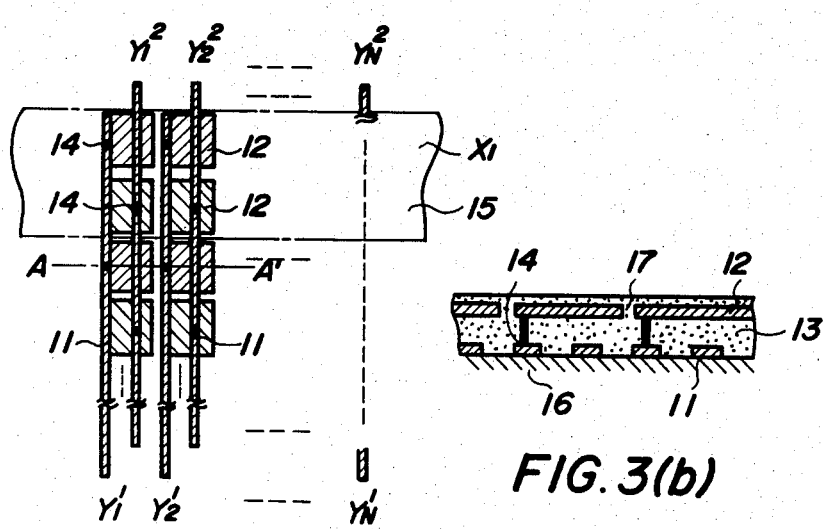
FIG. 3(a)
FIG. 3(b)

MATRIX TYPE LIQUID CRYSTAL DISPLAY PANEL

BACKGROUND OF THE INVENTION

The present invention relates to a matrix type liquid crystal display panel and more particularly to structure of a liquid crystal display panel with high resolution and increase in the number of matrix electrodes.

As a rule, a matrix display is of the type which has orthogonal strip electrodes disposed on it and the portion of the display where the electrodes are crossed forms a picture element thereby providing a visual display of characters, symbols, numerals, patterns of the like in response to selective application of a voltage to the respective X and Y electrodes. The most common problem with the matrix type display is that a voltage may be applied to some extent to a crossing of the X and Y electrodes not desired to operate (termed "non-selected point") in applying a more than threshold voltage to a crossing of the X and Y electrodes desired to operate (termed "selected point"). This causes the crosstalk phenomenon.

Actually in driving address-by-address a matrix type display which takes advantage of electro-optical effects of liquid crystal such as the twisted nematic field effects (TN), the dynamic scattering effects (DSM), the field induced double refraction effects (TB) and the guest host effects (GH), the crosstalk phenomenon often places non-selected points into the operating state, resulting in difficulties in displaying only the desired patterns. This is because the electro-optical effects of liquid crystals have electrically bidirectional features and sometimes show no definite threshold effects. A well known solution to this problem is the voltage amplitude selection method. Typically, an X electrode and a Y electrode are supplied with voltages $V_o$ and O when selected and with voltages $\frac{1}{3}V_o$ and $\frac{2}{3}V_o$ when not selected, respectively. As a result, each selected point of the X and Y electrode is supplied with a voltage O and each non-selected point with a voltage $\frac{1}{3}V_o$. This is termed the 1:3 voltage average method. In this instance a ratio of effective voltage on the selected point to that on the non-selected point can be represented below:

$$\frac{V_s \text{ (effective voltage on selected point)}}{V_u \text{ (effective voltage on non-selected point)}} = \sqrt{\frac{8}{N} + 1} \quad (1)$$

wherein n is the so-called degree of multiplexing and thus corresponds to the number of scanning electrodes in the XY matric panel.

Analysis of the formula (1) reveals that the ratio of $V_s/V_u$ is reduced with an increase in the number N of the scanning electrodes. $V_u$ is generally selected below a threshold voltage ($V_{th}$) of the electro-optical effects of liquid crystal and $V_s$ above the threshold voltage. While taking voltage dependency of the field effects, for example, the TN effects into account, the contrast property is depicted in FIG. 1, with contrast as ordinate and voltage as abscissa. The graph of FIG. 1 shows that contrast is remarkably increased upon a voltage higher than the threshold voltage $V_{th}$. The experiments were conducted with 25° C., 1 KHz, sine wave, liquid crystal of type E-8 marketed by B.D.H. Chemicals Ltd., and polarizers of type HN42 marketed by Polaroid Co. The graph is taked along normal direction.

In addition, a display with a reduced value of $V_s$ is rather less attractive from contrast and response standpoints—i.e., poor contrast and slow response, because response characteristics more particularly rising time ($\tau_r$) is inversely propertional to the square of voltage. The formula (1), therefore, implies impossibility of elevating N beyond a given limit. Though the foregoing has set forth specifically the 1:3 voltage method, it is also possible to generalize the advantages and disadvantages of a matrix type liquid crystal display panel as follows. An X line and a Y line are supplied with $V_o$ and O when selected and with $(1/a) V_o$ and $(2/a) V_o$ when non-selected, respectively. In this case, $V_s/V_u$ can be written below.

$$V_s/V_u = \sqrt{\frac{\sqrt{N}-1}{\sqrt{N}-1}} \quad (2)$$

wherein $a = \sqrt{N} + 1$

Like the formula (1), the above described formula (2) shows the trend for $V_s/V_u$ to reduce with an increased N. As noted earlier, to gain better contrast and quicker response, it is desirable that the number of N be as small as possible. It is however obvious that higher resolution offers a further improvement in the quality of the display in displaying a pattern on a limited area. To this end the number of N should be increased.

SUMMARY OF THE INVENTION

Accordingly, an object of the present invention is to overcome the above discussed conflict. The present invention provides a novel liquid crystal display which can increase not only resolution but also the number of scanning electrodes. One of the most important features of the present invention rests in an improvement of the pattern of matrix electrodes. Another important feature of the present invention is that a matrix type liquid crystal display is of the multi-layer structure. Assembling individually independent X and Y electrodes in a plane is accomplished concurrently with implementing the multi-layer structure. For example, when two sets of matrix electrodes are used and when the number of scanning electrodes is designated N, these electrodes are aligned in a plane and the 2XN matrix pattern is stacked in a two-layer fashion. In effect, this results in the formation of matrix electrodes with the number of scanning electrodes being 4N. Since four sets of matrix electrodes are electrically independent of one another, it becomes possible to apply to the liquid crystal composition the substantially same voltage value as in case of N matrix electrodes. If there are Q layers of matrix patterns each layer having P sets of matrix patterns of which the number of scanning electrodes is N, then a matrix display of which the number of scanning electrodes is P×Q×N will be available with suffering the same electrical condition as an N matrix display. Therefore, the present invention makes it possible to reduce the number of N readily and enhance resolution of a display. Though a multi-layer liquid crystal display is well known per se, for example, U.S. Pat. No. 3,994,331 entitled LIQUID CRYSTAL DISPLAY DEVICE and assigned to NCE Co., this is totally different from the matrix display type of liquid crystal display the present invention is concerned with.

In its broadest aspect, the present invention provides an XY matrix type liquid crystal display panel having a plurality of X electrodes aligned at a given interval in one direction, a plurality of Y electrodes aligned at a given interval in a direction normal to said one direction between the X and Y electrodes. While an electrode layer forming a set of the Y electrodes is shaped to connect divided picture element electrodes, the counterpart forming a set of the X electrodes is arranged to confront with two or more picture element electrodes along the Y axis. Each of the Y electrodes is divided into two along the Y axis.

In another aspect of the present invention, an XY matrix type liquid crystal display panel of multi-layer structure comprises a plurality of X electrodes aligned at a given interval in one direction, a plurality of Y electrodes aligned at a given interval in a direction normal to said one direction of said X electrodes and two or more layers of liquid crystal composition disposed between the X and Y electrodes, said X and Y electrodes being so arranged that electric field responsive operating regions of the respective liquid crystal composition layers are never overlapped with one another.

The liquid crystal composition within the above described structure is typically an approximately 90 degrees twisted nematic liquid crystal consisting of nematic liquid crystal or cholesteric liquid crystal with the inherent pitch longer than 40 μm which has the positive dielectric anisotropy. The direction of molecular alignment in the respective planes of the multi-layer structure is periodic. The difference Δn between reflective index for abnormal light and reflection index for normal light is correlated below.

$$d \cdot \Delta n \geqq 2 \; (\mu m)$$

wherein d is the thickness of the liquid crystal layer. Such relationship offers a substantial increase in contrast particularly in the XY matrix type liquid crystal display.

BRIEF DESCRIPTION OF THE DRAWINGS

Other objects and many of the attendant advantages of the present invention will be easily appreciated as the same becomes better understood by reference to the following detailed description which considered in conjunction with the accompanying drawings in which like reference numerals designate like parts throughout the figures thereof, and wherein:

FIG. 1 is a graph showing the relationship between effective voltage value and contrast ration in a twisted nematic (TN) liquid crystal cell;

FIGS. 3(a) through 6(c) show electrode pattern and cell structure in respective embodiments of the present invention wherein FIG. 2 is an electrode plane view of a first embodiment, FIG. 3(a) is an electrode plane view of a second embodiment, FIG. 3(b) is a cross sectional view taken along line A—A of FIG. 3(a), FIG. 4 is a cell cross-sectional view of a third embodiment, FIGS. 5(a) and 5(b) are electrode plane views, FIG. 6(a) is an electrode plane view of a first layer cell structure of a fourth embodiment, FIG. 6(b) is an electrode plane view of a second layer cell structure of the fourth embodiment and FIG. 6(c) is a cross sectional view of the liquid crystal structure of the fourth embodiment;

DETAILED DESCRIPTION OF THE INVENTION

Figures 4, 5A, 5B:
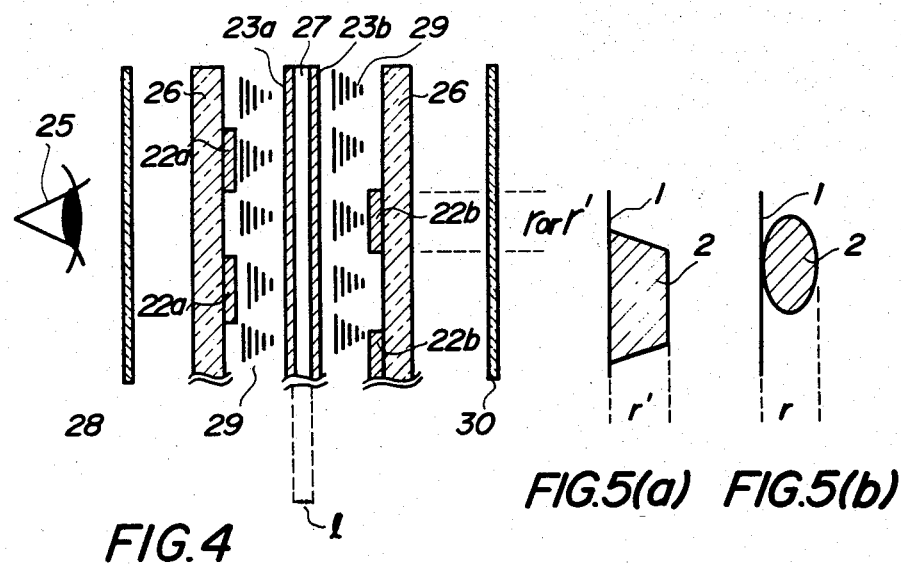

First of all, an electrode pattern is designed as shown in FIG. 2. According to the present invention, each of electrodes is divided into a plurality of regions with connections with each other unlike simple strip electrodes as viewed in a prior art matrix panel. The respective regions of the electrode as seen from FIG. 2 are physically and electrically connected together in a common plane. For example, a predetermined number of rectangular electrodes 2 made of transparent conducting material such as $In_2O_3$ and $SnO_2$ or reflective conducting material such as Al, Au, Cr and Ni are disposed along with a conducting strip 1 with keeping electrical connections thereto. Each of the electrodes 2 comprises two Y axis electrodes $Y_1^1$ and $Y_1^2$ disposed alternatively. The pair of these electrodes $Y_1^1$ and $Y_1^2$ forms a first Y axis electrode $Y_1$. As depicted by the phantom line, an X axis electrode is designed like a prior art strip electrode and made of $In_2O_3$ or $SnO_2$.

Another embodiment is illustrated in FIGS. 3(a) and 3(b), wherein electrodes are disposed at both sides of an insulating film and connected together through holes. In this instance the insulating film should be thick enough not to suffer any dielectric or electrical inerference. In FIGS. 3(a) and 3(b). Electrical connectors 11 made of conducting material such as Al, Au, Cr and Ni are disposed onto a substrate 16 of, for example, glass, quartz and plastic. A sufficiently thick dielectric film 13 of, for example, $SiO_2$, $MgF_2$, $Y_2O_3$ and $Si_3N_4$ is deposited on the connectors 11 and rectangular electrodes 12 are disposed at a given interval in the longitudinal direction and lateral direction. Through holes 14 are formed in a manner to connect the electrode 12 alternatively to the Y axis electrodes $Y_1^1$ or $Y_1^2$. These electrodes $Y_1^1$ and $Y_1^2$ form a first Y axis electrode $Y_1$. The X axis electrode 15, on the other hand, is shaped like a strip electrode as depicted by the phantom line. The reference number 17 designates a surface-active agent, a $SiO_2$ slant evaporation layer, a rubbed layer and so on. The conducting connectors 1, 11 should be narrow enough not to be viewable from outside but should be sufficiently wide so that voltage drops are negligible. Although in the embodiments of FIGS. 2, 3(a) and 3(b) the electrodes 2, 12 are alternatively disposed with 2N of the effective number of electrodes, it is obvious that the concept of the present invention is applicable to the case of 3N or more electrodes.

Moreover, it is also possible to dispose independent matrix electrodes in a multi-layer fashion though the above embodiments are adpated to dispose them in the single-layer liquid crystal cell. In this instance it is mandatory that respective layers of the liquid crystal cell be piled in a manner that electric-field responsive working regions of different liquid crystal layers never are overlapped. It is much important at the same time that the distance 1 between the first and second liquid crystal layers are equal to or smaller than the shorter radius r or shorter side length r' of the display working regions in order to avoid potential or position difference in a visual display inherent to the multi-layer liquid crystal cell.

A representative example of cell structure of the two-layered TN display element is shown in FIG. 4.

In FIG. 4, electrodes 22 are made of $In_2O_3$ or $SnO_2$ in the case of a transparent electrode and of Al, Au, Cr or Ni in the case of a reflective electrode and designed in the form of a rectangle as viewed from FIGS. 2 and 3(a) and 3(b) or a trapezium, ellipse or a circle as viewed from FIGS. 5(a) and 5(b). These electrodes 22a and 22b are disposed without overlapping when viewing from the viewer's eye. Substrates 26, 27 are made of glass, quartz or plastic. The thickness of the substrates 26, 27 is selected to be equal to or smaller than the shorter radius r or shorter side length r' of the display working regions in order not to appear the potential difference in a visual display. Transparent electrodes 23a and 23b of $In_2O_3$, $SnO_2$ or the like are formed as a strip electrode. This cell structure further includes a polarizer 28, a detector 30 and a TN liquid crystal layer 29.

Figures 6A, 6B:
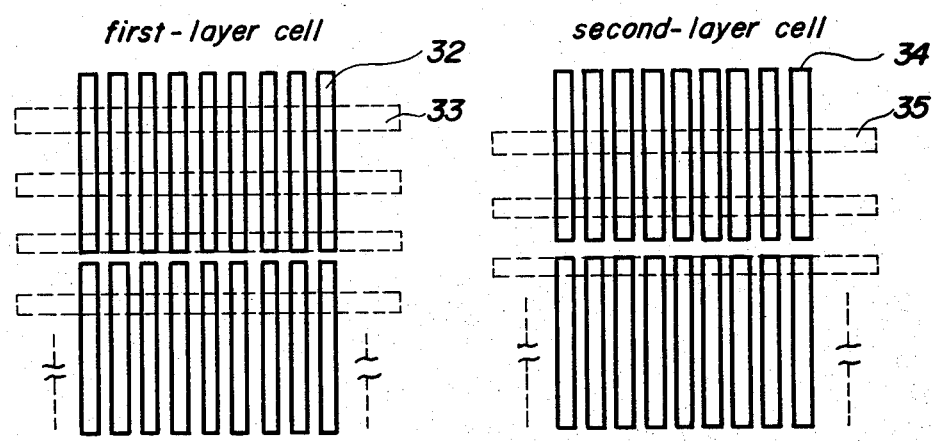
Figure 6C:
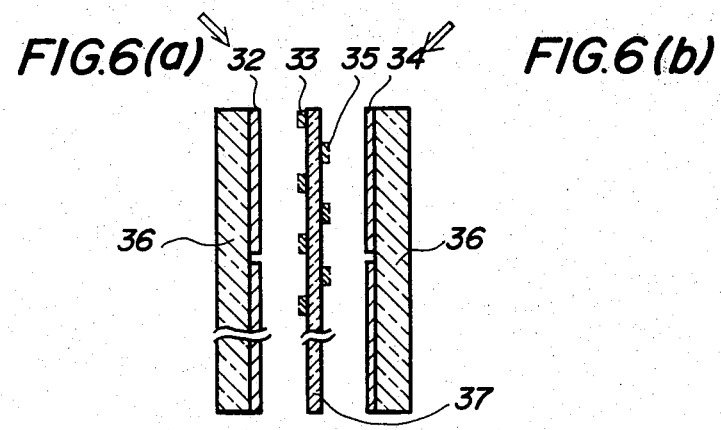

Still another embodiment of the present invention is illustrated in FIGS. 6(a), 6(b) and 6(c) wherein FIG. 6(a) shows a plane view of a first layer cell, FIG. 6(b) shows a plane view of a second layer cell and FIG. 6(c) shows a cross sectional view of the cell structure.

In FIG. 6(a), Y axis electrodes 32 of $In_2O_3$ or $SnO_2$ are aligned at a substantially small pitch while X axis electrode of $In_2O_3$ or $SnO_2$ are aligned at the double pitch as that of the Y axis electrode 32.

The Y axis electrode 34 and the X axis electrode 35 of FIG. 6(b) are alinged in the same manner as FIG. 6(a). It will be noted that, although the Y axis electrode 34 of the second layer cell and the Y axis electrode 32 of the first layer cell are disposed with overlapping with each other from the viewer's eye, the X axis electrode 35 of the second layer cell and the X axis electrode 33 of the first layer cell are disposed to avoid overlap. As seen from FIG. 6(c), the X axis electrode 33, 35 are aligned in zigzages with intervention of the substrate 37.

Figure 7:
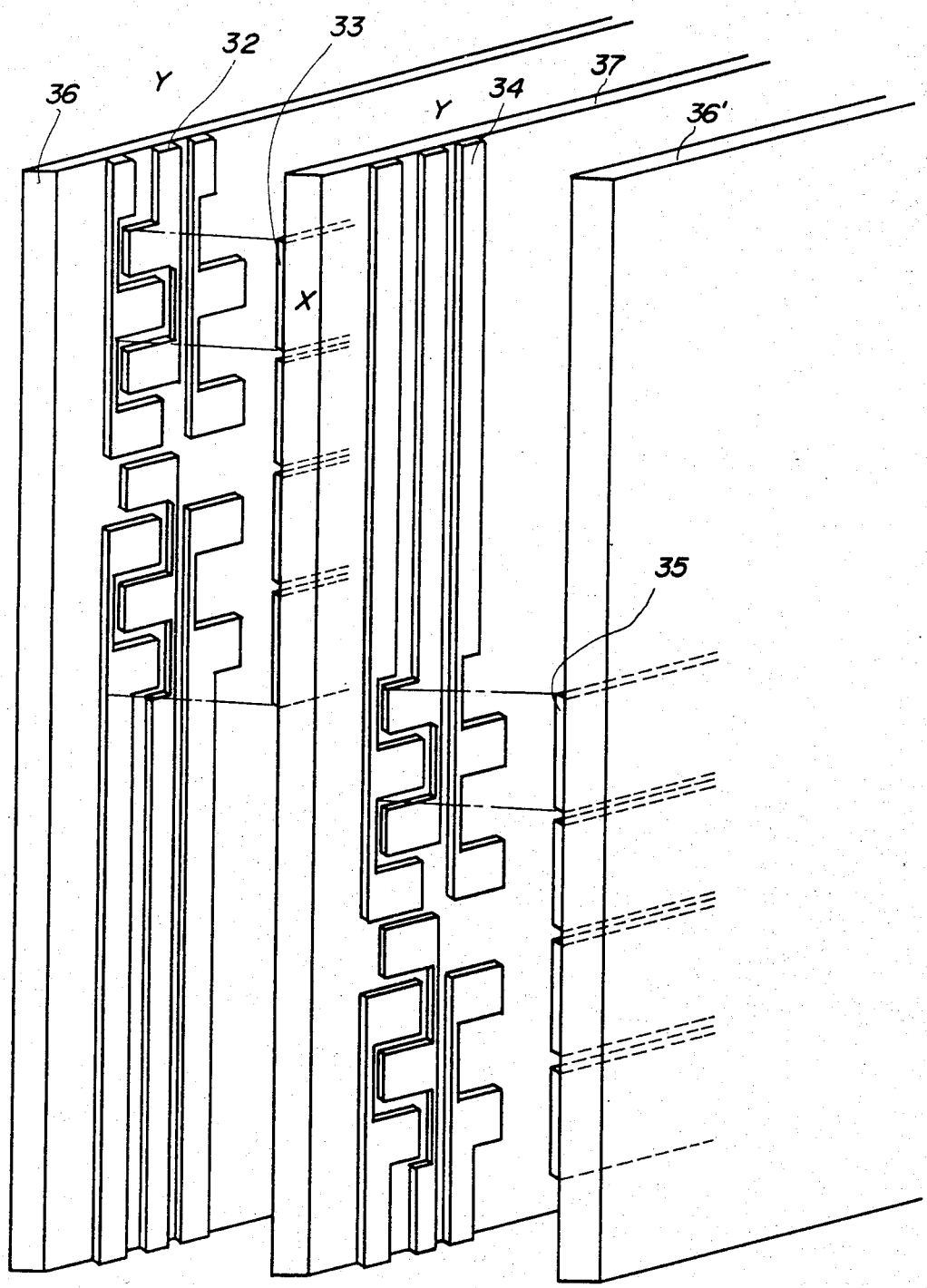
FIGS. 7 and 8 are a perspective view and a cross sectional view of a fifth embodiment.
Figure 8:
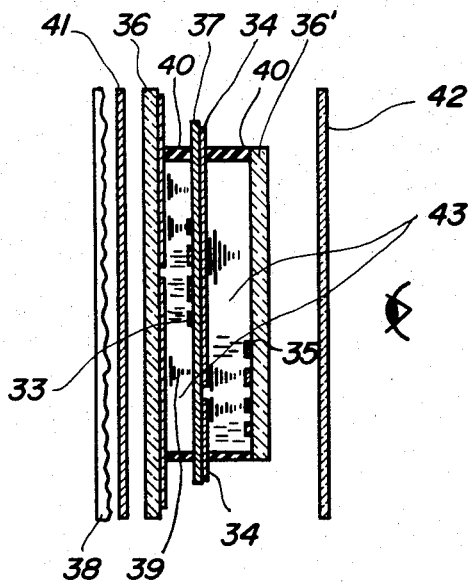

An embodiment shown in FIGS. 7 and 8 is adapted to incorporate the concepts shown in FIGS. 2, 6(a), 6(b), and 6(c) into a single display panel whereby the number of scanning electrodes can be increased to 8N. The display cell shown in FIG. 8 additionally includes a scattering reflective plate 38, a liquid crystal alignment 39, a plastic seal 40, a polarizer 41 and a detector 42.

As is well known, the multi-layer liquid crystal cell of 90 degrees twisted mode experiences the problem of how to improve the contrast characteristics thereof. The deteriorated contrast characteristics are considered due to the fact that linearly polarized light incident onto the cell could not rotate exactly 90 degrees in respective liquid crystal layers. This implies not only the difficulty of rotating polarized light by 90 degrees but also the accompanying results that linear polarized light is emitted from the cell in the form of elliptic polarization having optical activity. In addition, the twisted nematic liquid crystal cell is supposed to rotate linear polarized light by 90 degrees only when linear polarized light strikes on the cell substrate in the longitudinal axis direction of liquid crystal molecules or the direction normal to that longitudinal direction. That is, in the event that linear polarized light fails to rotate completely by 90 degrees in the first-layer cell, light incident onto the second-layer cell will take the form of elliptic polarization having optical activity due to retardation and light passing through the second-layer cell will be in the form of much elliptic polarization. Eventually, efficiency in passing a linear polarizer will drop resulting in deteriorating the contrast chracteristics. To improve the contrast characteristics, it is necessary to rotate incident linear polarized light in the respective layers of twisted nematic liquid crystal as exactly 90° degrees as possible. This can be accomplished by fulfilling the so-called "Mauguin limit" in the light transmission mode within the twisted nematic liquid crystal (a sort of cholesteric liquid crystal). The criteria for the "Mauguin limit" (C. Mauguin: Bull Soc, Fr. Miner, Cristallogr, 34 3 (1911)) are defined below $$\lambda = a \cdot d \Delta n \quad (1)$$

wherein $\lambda$ is the wavelength, d is the thickness of the liquid crystal layer $\Delta n (= ne - no)$ is the difference between refractive index for normal light and that for abnormal light, and a is the constant.

If the criteria as defined in (1) is satisfied, incident linear polarized light can pass through the twisted nematic layer with 90-degree rotation. The constant a in the formula (1) was 0.35 through the inventors' experiments referring to the condition where a contrast ration is one half.

Provided that the longest waveform of visible light is $\lambda = 700$ nm for red light, $$d \cdot \Delta n \geq 700 \text{ mn}/0.35 \geq 2 \ \mu m \quad (2)$$

Selection of the value $d \cdot \Delta n$ greater than 2 $\mu$m is, therefore, most important to enhanced a contrast ratio (more than one half the maximum).

Figure 9:
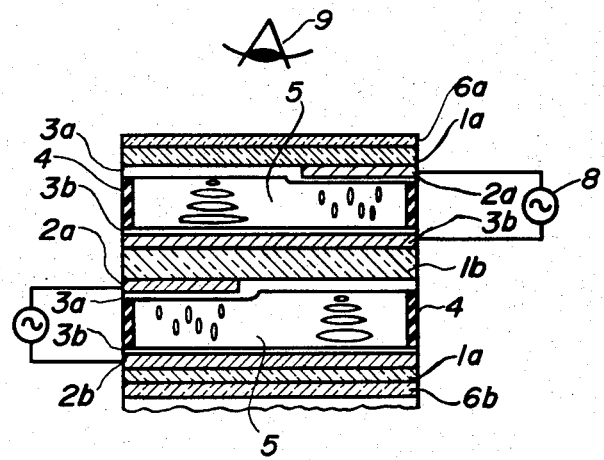
FIG. 9 is a cross sectional view of a two-layer liquid crystal cell to which one way to enhance contrast is applicable.
Figure 10:
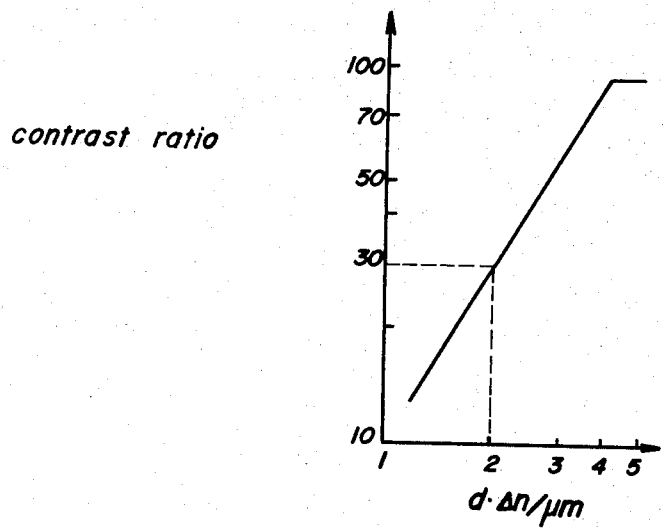
FIG. 10 is a graph showing the dependency between contrast ratior and d·Δn in the cell of FIG. 9.
Figure 11:
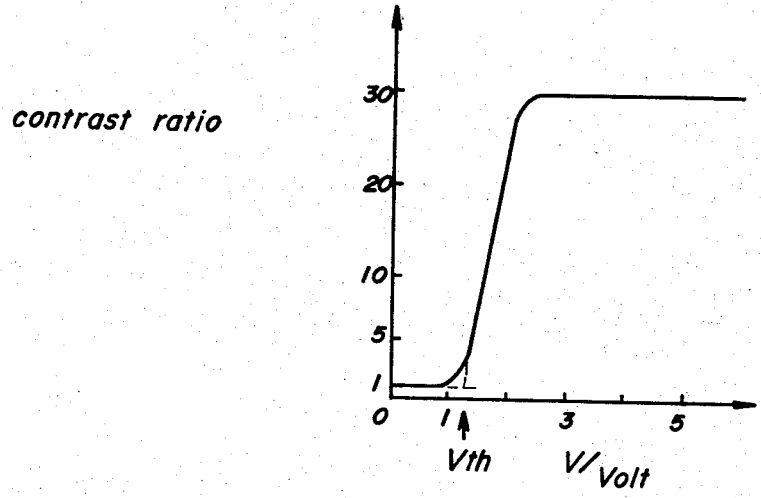
FIG. 11 is a graph showing the relationship between applied voltage and contrast ratio.

FIG. 9 shows a two-layer twisted nematic liquid crystal cell wherein the components are given the same numbers as in FIG. 4 wherever possible in order to point up the close relationship. FIG. 10 shows a graph of the dependency of the contrast ratio of the two-layer twisted nematic liquid crystal cell shown in FIG. 3 upon the value $d_2 \cdot \Delta n$, FIG. 11 shows a graph of the relationship between applied voltage and contrast for the purpose of definition of a contrast ratio. In FIGS. 9 and 10, the value $d_1 \cdot \Delta n$ of the first-layer twisted nematic liquid crystal cell is fixed at 2 $\mu$m, and that of the second-layer cell should be as great as possible because the dependency of the contrast ratio upon $d \cdot \Delta n$ in the second-layer cell is viewed over a much extended range of $d \cdot \Delta n$ than the single-layer cell. Preferably, the permissible value of the contrast ratio is at least approximately one third the maximum (30:1 to 100:1) for practical use. It is, therefore, important for the respective layers to meet the criteria $d \cdot \Delta n = 2 \ \mu m$.

As an effectual way to meet the above defined criteria, there are two possibilities:

(1) to increase $d_i$ and (2) to increase $\Delta n$. Because the response characteristics of the cell generally depend upon $d^2$, $d_i$ can not be increased excessively and actually have a limit up to approximately 12 $\mu$m. Approximately 8 $\mu$m is more desirable. In this instance the value of $\Delta n$ should be selected to meet $\Delta n \gtrsim 0.25$. TABLE 1 shows the value of $\Delta n$ of commercially available liquid crystal composition, wherein ⊚ represents applicability to the present invention.

TABLE I

| liquid crystal | manufacturer | Δn | applicability |
|---|---|---|---|
| ROTN 200 Schiff's bas | Roche | 0.28 | ◎ |
| ROTN 103 ester | Roche | 0.22 | X |
| ROTN 403 biphenyl pyrimidine | Roche | 0.26 | ◎ |
| $E_7$ biphenyl | BDH | 0.22 | X |
| N-5 azoxy | Merck | 0.29 | ◎ |
| N-1083 phnylcyclohexane | Merck | 0.12 | X |

*$d_i = 8$ μm  ◎ : good (Δn ≳ 0.25)
X : bad (Δn < 0.25)

Actually, when the thickness of the liquid crystal layer is $d_i$ and the difference between the refractive index ($n_e$) for abnormal light and that ($n_o$) for normal light, namely, ($n_e - n_o$) is n, the thickness of the liquid crystal in FIG. 9, the layer is selected to be equal to or greater than 2.5 m.

The liquid crystal material used in the above described embodiments may include nematic liquid crystal, cholesteric liquid crystal, dichromatic dyes, fluorescent dyes, alignment agents, ion adding agents and also smectic liquid crystal. The electrode material on one side may be made of electrically conducting material which reflects or absorbs light as far as that on the other side is transparent. The transparent electrode material may be $In_2O_3$ and $SnO_2$ and reflective electrode material may be Al, An, Cr, Ni and so on. Insulating film material may be $SiO_2$, $MgF_2$, $Y_2O_3$, $Si_3N_4$ and so on. It is also apparent that the present invention is applicable to the transmission type, projection type and reflective type.

The invention being thus described, it will be obvious that the same may ve varied in many ways. Such modifications are not to be regarded as a departure from the spirit and scope of the invention, and all such modifications are intended to be included within the scope of the following claims.

What is claimed is:

1. An XY matrix liquid crystal display comprising:
    a plurality of X electrodes aligned at given spaced intervals in a first direction;
    a plurality of Y electrodes aligned at given spaced intervals in a second direction normal to said first direction, adjacent electrode pairs of said plurality of Y electrodes being interleaved with each other to form spaced electrode areas which alternate in said first direction; and
    a layer of liquid crystal composition disposed between said plurality of X electrodes and said plurality of Y electrodes;
    wherein the dimensions of each of said X electrodes in said first direction is substantially the same as the dimension of two of said interleaved electrode areas in said first direction, each of said X electrodes being superimposed over two of said electrode areas from each of said electrode pairs.

2. The XY matrix type liquid crystal display panel as defined in claim 1 wherein said panel comprises two or more layers of liquid crystal composition disposed between X and Y electrodes;
    said X and Y electrodes arranged so that the electric field-responsive operating regions of the respective liquid crystal compostion layers do not overlap.

3. An XY matrix liquid crystal display panel comprising:
    at least two liquid crystal display layers, each of said liquid crystal display layers including,
    a plurality of X electrodes aligned at given spaced intervals in a first direction,
    a plurality of Y electrodes aligned at given spaced intervals in a second direction normal to said first direction, and
    a layer of liquid crystal composition disposed between said plurality of X electrodes and said plurality of Y electrodes,
    said plurality of X electrodes and said plurality of Y electrodes overlapping to form electric field responsive operating regions;
    said liquid crystal display layers being stacked so that said electric field responsive operating regions of the respective liquid crystal display layers are not overlapped with each other.

4. The XY matrix liquid crystal display panel of claim 3, wherein adjacent electrode pairs of said plurality of Y electrodes are interleaved to form spaced electrode areas which alternate in said first direction; and
    wherein the dimension of each of said X electrodes in said first direction is substantially the same as the dimension of two of said interleaved electrodes in said first direction, each of said X electrodes being superimposed over two of said electrode pairs to form said electric field-responsive operating regions.

5. The XY matrix type liquid crystal display panel of claims 1 or 3 wherein said layer of liquid crystal composition is an approximately 90 degrees twisted nematic liquid crystal consisting of nematic liquid crystal or cholesteric liquid crystal with the inherent pitch longer than 40 μm which has the positive dielectric anisotropy, the direction of molecular alignment being periodic and the difference Δn between reflective index for abnormal light and reflection index for normal light being defined below, $$d \cdot \Delta n \geqq 2 \, (\mu m)$$

wherein d is the thickness of said layer of liquid crystal composition.

* * * * *